United States Patent
Kwak et al.

(10) Patent No.: US 11,184,798 B2
(45) Date of Patent: Nov. 23, 2021

(54) DEVICE AND METHOD FOR DATA TRANSMISSION BETWEEN BASE STATIONS IN WIRELESS COMMUNICATION SYSTEM

(71) Applicant: Samsung Electronics Co., Ltd., Suwon-si (KR)

(72) Inventors: Dongho Kwak, Hwaseong-si (KR); Dongsook Kim, Suwon-si (KR); Hanseok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 16/488,479

(22) PCT Filed: Feb. 23, 2018

(86) PCT No.: PCT/KR2018/002289
§ 371 (c)(1),
(2) Date: Aug. 23, 2019

(87) PCT Pub. No.: WO2018/155966
PCT Pub. Date: Aug. 30, 2018

(65) Prior Publication Data
US 2019/0387432 A1     Dec. 19, 2019

(30) Foreign Application Priority Data
Feb. 24, 2017  (KR) .................. 10-2017-0024897

(51) Int. Cl.
*H04W 28/06* (2009.01)
*H04W 80/08* (2009.01)
(Continued)

(52) U.S. Cl.
CPC .......... *H04W 28/06* (2013.01); *H04W 80/08* (2013.01); *H04W 88/08* (2013.01); *H04W 92/20* (2013.01)

(58) Field of Classification Search
CPC .... H04L 1/1877; H04W 28/04; H04W 28/06; H04W 80/08; H04W 88/08; H04W 92/20
See application file for complete search history.

(56) References Cited

U.S. PATENT DOCUMENTS 10,009,409 B2 *  6/2018  Reider ............... H04L 69/22
2003/0169741 A1 *  9/2003  Torsner ............. H04L 1/187
                                                            370/394
(Continued)

FOREIGN PATENT DOCUMENTS

KR   10-2011-0077647 A   7/2011
KR   10-2012-0016168 A   2/2012
(Continued)

OTHER PUBLICATIONS

3GPP TS 36.425 V14.2.0 (Jun. 2018), 3rd Generation Partnership Project; Technical Specification Group Radio Access Network; Evolved Universal Terrestrial Radio Access Network (E-UTRAN); X2 interface user plane protocol (Release 14), 650 Route des Lucioles—Sophia Antipolis Valbonne—France.
(Continued)

*Primary Examiner* — Saad A. Waqas
(74) *Attorney, Agent, or Firm* — Jefferson IP Law, LLP

(57) ABSTRACT

The general purpose of the present disclosure is to retransmit data between base stations in a wireless communication system, and an operating method of a base station comprises the steps of: receiving, from another base station, information on unreceived packets; and retransmitting at least one unreceived packet among the unreceived packets to another base station based on the received information, wherein the at least one unreceived packet is determined based on a difference value between an identification number of the unreceived packets and an identification number of a last packet transmitted to the other base station.

4 Claims, 13 Drawing Sheets

(51) Int. Cl.
*H04W 88/08* (2009.01)
*H04W 92/20* (2009.01)

(56) References Cited

U.S. PATENT DOCUMENTS

| | | | |
|---|---|---|---|
| 2007/0274342 A1 | 11/2007 | Kim et al. | |
| 2008/0130580 A1 | 6/2008 | Chaponniere et al. | |
| 2012/0201177 A1* | 8/2012 | Adachi | H04B 1/44 370/310 |
| 2015/0036593 A1 | 2/2015 | Uchino et al. | |
| 2015/0215987 A1 | 7/2015 | Kim et al. | |
| 2015/0264562 A1 | 9/2015 | Wu | |
| 2015/0280905 A1 | 10/2015 | Shah et al. | |
| 2015/0382395 A1 | 12/2015 | Yang et al. | |
| 2016/0065700 A1 | 3/2016 | Yi et al. | |
| 2016/0119826 A1* | 4/2016 | Huh | H04W 76/15 370/332 |
| 2016/0142951 A1* | 5/2016 | Balasubramanian | H04W 36/023 370/331 |
| 2016/0156564 A1 | 6/2016 | Yu et al. | |
| 2017/0374579 A1* | 12/2017 | Wang | H04W 28/0278 |
| 2018/0124642 A1* | 5/2018 | Phuyal | H04W 24/10 |

FOREIGN PATENT DOCUMENTS

| | | |
|---|---|---|
| KR | 10-1224334 B1 | 1/2013 |
| KR | 10-2014-0133345 A | 11/2014 |
| KR | 10-2015-0090815 A | 8/2015 |
| WO | 2015/176748 A1 | 11/2015 |
| WO | 2017/023444 A1 | 2/2017 |

OTHER PUBLICATIONS

3GPP TSG-RAN2 #87 meeting, "Report on [86#30][LTE/DC] Implementation of PDCP reordering function in PDCP specification (Samsung)", R2-143125, Aug. 18-22, 2014.
European Search Report dated Jan. 31, 2020, issued in European Patent Application No. 18757307.6.
European Office Action dated May 20, 2021, issued in European Patent Application No. 18757307.6.

\* cited by examiner

DEVICE AND METHOD FOR DATA TRANSMISSION BETWEEN BASE STATIONS IN WIRELESS COMMUNICATION SYSTEM

TECHNICAL FIELD

The disclosure generally relates to data transmission between base stations in a wireless communication system and, more particularly, to a device and a method for determining whether to retransmit data between base stations in a wireless communication system.

BACKGROUND ART

Generally, mobile communication systems have been developed to provide communication services while securing the mobility of users. Such mobile communication systems have reached the stage of providing not only voice communication services but also high-speed data communication services due to rapid technological advancement.

In a Long-Term Evolution (LTE) system, which is a fourth-generation mobile communication system arising from the 3rd Generation Partnership Project (3GPP), the standardization of small cell base stations, used to cover a much smaller area than an existing macrocell base station, has been conducted.

Base stations may be classified into macro base stations, pico base stations, femto base stations, and the like depending on the size of the area to cover. A macro base station is a base station available to cover a wider area than a pico base station and a femto base station, and a pico or femto base station is also referred to as a small cell base station by the 3GPP. The 3GPP defines dual connectivity (DC) in order to efficiently use a network in the state of coexistence of a macrocell base station and a small cell base station.

Dual connectivity refers to a transmission method that enables a terminal to simultaneously use radio resources provided by two or more base stations (e.g., a macro base station and a small base station) to thereby increase transmission efficiency. For example, dual connectivity is the case where a terminal that is connected to a macro base station is additionally connected to a small base station, which is similar to the addition of radio resources in carrier aggregation. However, unlike carrier aggregation, dual connectivity allows for a certain level of transmission delay time due to a non-ideal backhaul between two base stations. Further, in dual connectivity, when base stations exchange data via a non-ideal backhaul, data retransmission may need to be performed due to data loss.

DISCLOSURE OF INVENTION

Technical Problem

Therefore, in view of the above discussion, the disclosure provides a device and a method for determining whether to retransmit data between base stations in a wireless communication system.

Also, the disclosure provides a device and a method for determining whether to retransmit data between base stations providing dual connectivity (DC) in a wireless communication system.

Further, the disclosure provides a device and a method for determining whether to request retransmission of data between base stations providing dual connectivity in a wireless communication system.

In addition, the disclosure provides a device and a method for determining whether to retransmit data or whether to request retransmission of data in the event of data loss due to a non-ideal backhaul between base stations providing dual connectivity in a wireless communication system.

Furthermore, the disclosure provides a device and a method for determining whether to retransmit data or whether to request retransmission of data between base stations providing dual connectivity based on a packet identification number and a reordering window value in order to prevent enciphering parameter de-synchronization in a wireless communication system.

Solution to Problem

In accordance with various embodiments of the disclosure, an operating method of a base station in a wireless communication system includes: receiving information regarding missed packets from a different base station; and retransmitting at least one missed packet among the missed packets to the different base station based on the received information, wherein the at least one missed packet is determined based on a difference value between an identification number of the missed packets and an identification number of a last packet transmitted to the different base station.

In accordance with various embodiments of the disclosure, an operating method of a base station in a wireless communication system includes: determining missed packets based on a packet received from a different base station; and transmitting a request for retransmission of at least one missed packet among the missed packets to the different base station, wherein the at least one missed packet is determined based on a difference value between an identification number of the missed packets and an identification number of a last packet received from the different base station.

In accordance with various embodiments of the disclosure, a base station device in a wireless communication system includes: a transceiver; and a controller configured to receive information regarding missed packets from a different base station and to retransmit at least one missed packet among the missed packets to the different base station based on the received information through the transceiver, wherein the at least one missed packet is determined based on a difference value between an identification number of the missed packets and an identification number of a last packet transmitted to the different base station.

In accordance with various embodiments of the disclosure, a base station device in a wireless communication system includes: a transceiver; and a controller configured to determine missed packets based on a packet received from a different base station and to transmit a request for retransmission of at least one missed packet among the missed packets to the different base station through the transceiver, wherein the at least one missed packet is determined based on a difference value between an identification number of the missed packets and an identification number of a last packet received from the different base station.

Advantageous Effects of Invention

A device and a method according to various embodiments of the disclosure may determine whether to retransmit data or whether to request retransmission of data in the event of data loss due to a non-ideal backhaul between base stations in a dual-connectivity situation, thereby preventing enciphering parameter de-synchronization in a terminal. Accordingly, it is possible to prevent deterioration in communication quality and to prevent a decrease in overall system throughput.

Effects which can be acquired by the disclosure are not limited to the above described effects, and other effects that have not been mentioned may be clearly understood by those skilled in the art from the following description.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a device and a method for determining data retransmission between base stations in a wireless communication system. Specifically, the disclosure illustrates a technology for determining data not to be retransmitted among missed data to thereby prevent enciphering parameter de-synchronization when data loss occurs due to a non-ideal backhaul between base stations in a wireless communication system.

As used herein, terms referring to network entities (e.g., a master eNodeB (MeNB), a secondary eNodeB (SeNB), or the like), terms referring to control information (e.g., a hyper frame number (HFN), a packet data convergence protocol (PDCP) sequence number (SN), or the like), terms referring to components of a device, terms referring to communication protocols (e.g., X2-user plane (UP) or the like), terms referring to communication techniques, and the like are used for convenience of description. However, the disclosure is not limited by the following terms, and other terms having equivalent technical meanings may be used.

Further, although the disclosure illustrates various embodiments using a Long-Term Evolution (LTE) system and an LTE-Advanced (LTE-A) system, these systems are provided merely for convenience of description. Various embodiments of the disclosure may be easily modified and applied to other communication systems.

Figure 1:
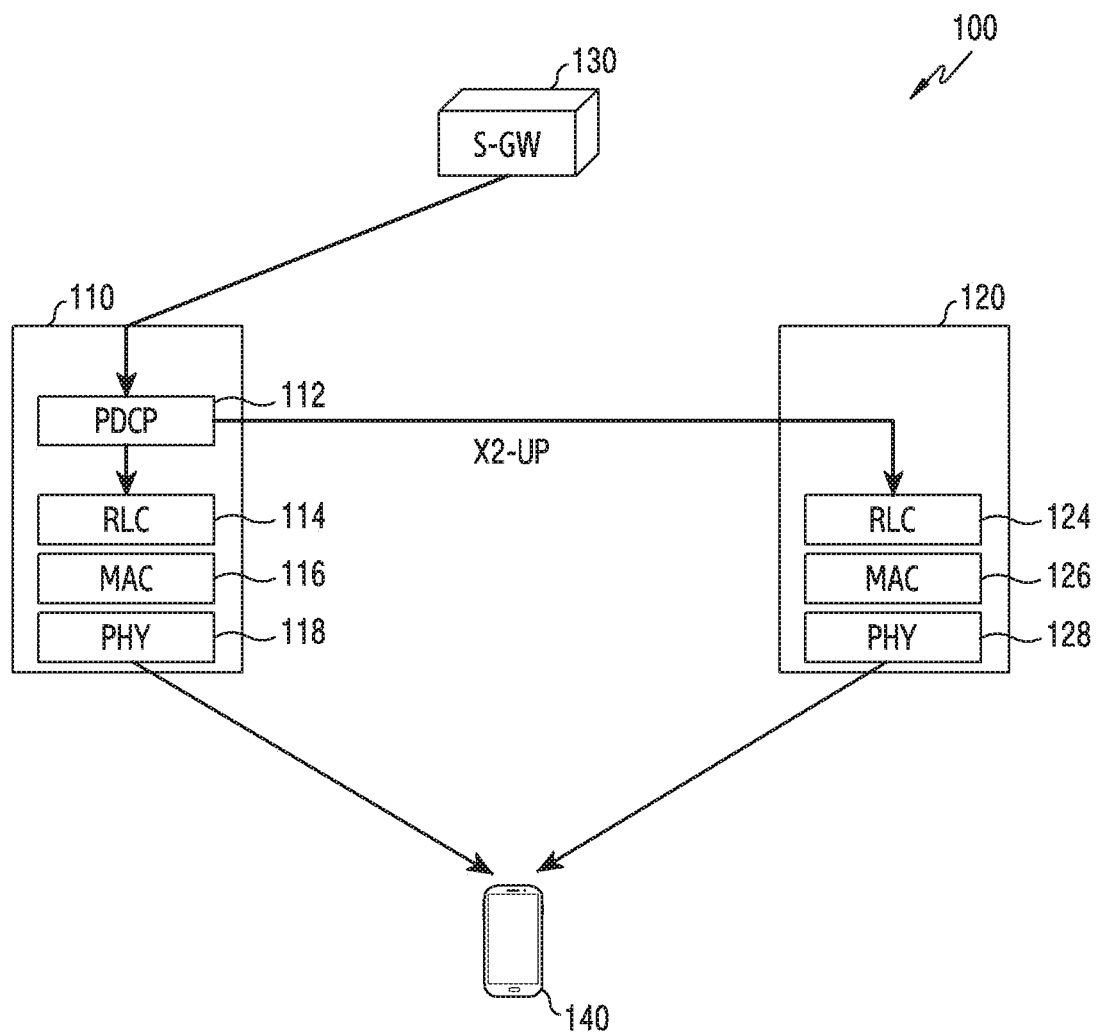
FIG. 1 illustrates a wireless communication system according to various embodiments of the disclosure.

FIG. 1 illustrates a wireless communication system according to various embodiments of the disclosure. Referring to FIG. 1, the system includes a first base station 110, a second base station 120, a serving gateway (S-GW) 130, and a terminal 140.

The first base station 110 and the second base station 120 provide wireless access for the terminal 140. Each of the first base station 110 and the second base station 120 is one of entities forming an access network, and covers a certain geographic range. Each of the first base station 110 and the second base station 120 may be referred to as an access point (AP), an eNodeB (eNB), a 5th-generation (5G) node, a wireless point, a transmission/reception point (TRP), or other terms with equivalent technical meanings, in addition to a base station.

According to one embodiment, the first base station 110 may be a macrocell base station having wider coverage, and the second base station 120 may be a small cell base station used to cover a smaller area than the macrocell base station. That is, the second base station 120 may be a picocell or femtocell base station covering a smaller area than the macrocell base station.

According to one embodiment, the first base station 110 and the second base station 120 may simultaneously provide radio resources to the terminal 140 through dual connectivity (DC). That is, the first base station 110 and the second base station 120 may provide dual connectivity to the terminal 140. In dual connectivity, the terminal 140 may receive data from the first base station 110 and the second base station 120 in a split bearer mode.

The S-GW 130 is a network entity for connecting the terminal 140 to an external network (e.g., an Internet Protocol (IP) network) and may interwork with the first base station 110 or may interwork with each of the first base station 110 and the second base station 120. For example, the S-GW 130 may interwork with the first base station 110 via an S1 protocol, and the second base station 120 may receive data, which is received from the S-GW 130, through the first base station 110 via the X2-UP protocol.

The terminal 140 is a user device and communicates with the first base station 110 and the second base station 120 through a wireless channel. The terminal 140 may transmit and receive a data packet from and to the first base station 110 and the second base station 120. For example, in dual connectivity, the terminal 140 may receive a data packet from the first base station 110 and the second base station 120. In various embodiments, the terminal 140 may be a portable electronic device and may be one of a smartphone, a portable terminal, a mobile phone, a mobile pad, a media player, a tablet computer, a handheld computer, or a personal digital assistant (PDA). In other embodiments, the terminal 140 may be a stationary device. Further, the terminal 140 may be a device having the functions of two or more of the aforementioned devices in combination.

As described above, the first base station 110 and the second base station 120 may provide dual connectivity to the terminal 140. To this end, the first base station 110 may operate as a master base station, and the second base station 120 may operate as a secondary base station. In this case, the protocol stack of the first base station 110 may include a packet data convergence protocol (PDCP) 112, a radio link control (RLC) 114, a media access control (MAC) 116, and a physical layer (PHY) 118. The protocol stack of the second base station 120 may include an RLC 124, a MAC 126, and a PHY 128. That is, the protocol stack of the second base station 120 does not include a PDCP layer, and processing of a PDCP layer for the terminal 140 may be performed by the first base station 110, which is the master base station. The master base station may be referred to as a MeNB, and the secondary base station may be referred to as a SeNB.

The PDCP 112 processes an Internet Protocol (IP) packet provided from the S-GW 130, that is, a PDCP service data unit (SDU), thereby generating a PDCP protocol data unit (PDU). Here, the PDCP 112 may compress a header part of the IP packet, may encipher the IP packet, and may insert a PDCP header including a PDCP sequence number (SN) into the IP packet.

The RLC 114 may provide an SDU transmission service for information provided from the PDCP 112 or may divide an SDU. The RLC 124 may provide an SDU transmission service for information provided from the PDCP 112 through an X2 user plane (X2-U) interface or may divide an SDU. The MAC 116 and the MAC 126 may perform logical channel multiplexing, hybrid automatic repeat request (HARQ) retransmission management, uplink/downlink scheduling, and the like on information provided respectively from the RLC 114 and the RLC 124. The PHY 118 and the PHY 128 may be divided into a baseband (BB) layer and a radio frequency (RF) layer. Each of the PHY 118 and PHY 128 may perform baseband processing of a signal to be transmitted and upconversion of the signal to be transmitted in order to transmit information provided respectively from the MAC 116 and the MAC 126 through a radio resource. In addition, the PHY 118 and the PHY 128 may downconvert a signal received from the terminal 140 through a radio resource and may perform baseband processing of the received signal.

During dual connectivity, the first base station 110 processes signaling of control information for the terminal 140. To this end, the first base station 110 may configure a signaling radio bearer (SRB) for control information received from the S-GW 130 through the S1 interface. The first base station 110 may provide the control information to the terminal through the configured SRB. The first base station 110 may provide control information received from the terminal 140 to the S-GW 130 through the configured SRB.

During dual connectivity, the first base station 110 may provide data, which is received from the S-GW 130 via the S1 interface, to the second base station 120 via the X2-U interface by the PDCP 112. Some of the data received from the S-GW 130 via the S1 interface may be provided by the PDCP 112 to the second base station 120 via the X2-U interface, and the remaining data may be transmitted to the terminal 140 via the PDCP 112, the RLC 114, the MAC 116, and the PHY 118 through a radio bearer. Here, the RLC 124 of the second base station 120 receives the data transmitted from the PDCP 112 and transmits the received data to the terminal 140 via the MAC 126 and the PHY 128 through a radio bearer.

Figure 2:
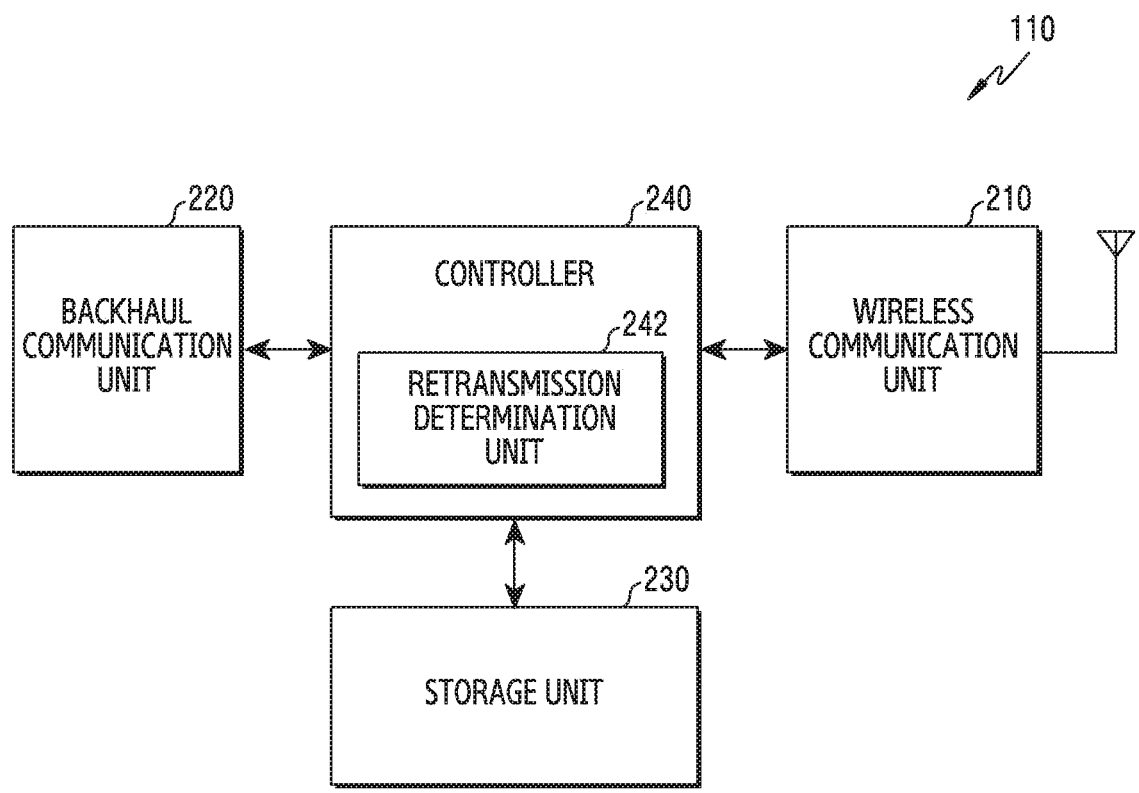
FIG. 2 illustrates the configuration of a master base station in a wireless communication system according to various embodiments of the disclosure.

FIG. 2 illustrates the configuration of a first base station 110 in a wireless communication system according to various embodiments of the disclosure. The terms 'unit,' '-or/er,' and the like used herein indicate a unit for processing at least one function or operation, which may be implemented by hardware, software, or a combination thereof. As illustrated in FIG. 2, the first base station 110 includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical layer specification of a system. For example, in data transmission, the wireless communication unit 210 encodes and modulates a transmitted bit stream to generate complex symbols. Further, in data reception, the wireless communication unit 210 demodulates and decodes a baseband signal to reconstruct a received bit stream. The wireless communication unit 210 upconverts a baseband signal into an RF band signal, and may transmit the RF band signal through an antenna. The wireless communication unit 210 downconverts an RF band signal, received through the antenna, into a baseband signal.

To this end, the wireless communication unit 210 may include a transmission filter, a reception filter, an amplifier, a mixer, an oscillator, a digital-to-analog converter (DAC), an analog-to-digital converter (ADC), or the like. Further, the wireless communication unit 210 may include a plurality of transmission/reception paths. In addition, the wireless communication unit 210 may include at least one antenna array including a plurality of antenna elements. From the aspect of hardware, the wireless communication unit 210 may include a digital unit and an analog unit, and the analog unit may include a plurality of sub-units depending on the operating power, operating frequency, or the like.

As described above, the wireless communication unit 210 transmits and receives a signal. Accordingly, the wireless communication unit 210 may be referred to as a transmitter, a receiver, or a transceiver. In the following description, transmission and reception performed through a wireless channel are to be understood as including processing performed as described above by the wireless communication unit 210.

The backhaul communication unit 220 provides an interface for performing communication with other nodes in a network. That is, the backhaul communication unit 220 converts a bit stream, which is transmitted from the first base station 110 to another node, for example, another access node, another base station, a higher node, a core network, or the like, into a physical signal, and converts a physical signal, which is received from another node, into a bit stream. For example, the backhaul communication unit 220 may convert a bit stream, which is transmitted from the first base station 110 to a second base station 120, into a physical signal and may convert a physical signal, which is received from the second base station 120, into a bit stream. In another example, the backhaul communication unit 220 may convert a bit stream, which is transmitted from the first base station 110 to a S-GW 130 according to an S1 protocol, into a physical signal and may convert a physical signal, which is received from the S-GW 130 according to the S1 protocol, into a bit stream.

The storage unit 230 stores data, such as a default program, an application, and setting information, for the operation of the first base station 110. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station. For example, the controller 240 transmits and receives a signal through the wireless communication unit 210 or the backhaul communication unit 220. Further, the controller 240 records and reads data in the storage unit 230. To this end, the controller 240 may include at least one processor. For example, the controller 240 may control the first base station 110 to perform operations according to various embodiments to be described below. In particular, the controller 240 may determine whether to perform retransmission under a certain condition in retransmitting missed data among data transmitted by the first base station 110 to the second base station 120 according to various embodiments to be illustrated below. To this end, the controller 240 may include a retransmission determination unit 242. For example, the retransmission determination unit 242 may include a PDCP processing block and an X2-U protocol processing block. The X2-U protocol processing block may determine PDCP PDUs to retransmit and may deliver a PDCP SN for which retransmission is requested to the PDCP processing block. Here, the retransmission determination unit 242 is an instruction set or code stored in the storage unit 230 and may be an instruction/code at least temporarily residing in the controller 240, a storage space storing an instruction/code, or part of circuitry forming the controller 240. For example, the controller 240 controls the first base station 110 to perform a procedure according to various embodiments to be illustrated below.

Figure 3:
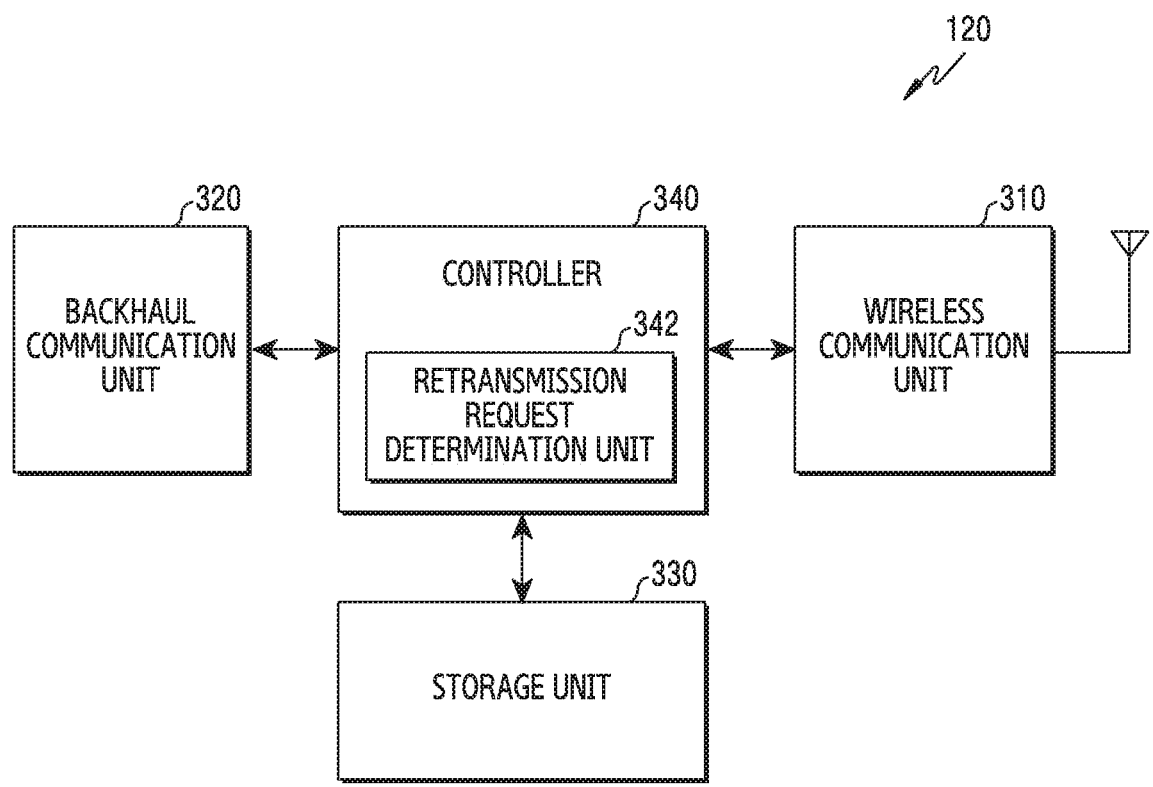
FIG. 3 illustrates the configuration of a secondary base station in a wireless communication system according to various embodiments of the disclosure.

FIG. 3 illustrates the configuration of a second base station 120 in a wireless communication system according to various embodiments of the disclosure. The terms 'unit,' '-or/er,' and the like used herein indicate a unit for processing at least one function or operation, which may be implemented by hardware, software, or a combination thereof. As illustrated in FIG. 3, the second base station 120 includes a wireless communication unit 310, a backhaul communication unit 320, a storage unit 330, and a controller 340.

The wireless communication unit 310 performs functions for transmitting or receiving a signal through a wireless channel. For example, the wireless communication unit 310 performs a function of conversion between a baseband signal and a bit stream according to the physical layer specification of a system. For example, in data transmission, the wireless communication unit 310 encodes and modulates a transmitted bit stream to generate complex symbols. Further, in data reception, the wireless communication unit 310 demodulates and decodes a baseband signal to reconstruct a received bit stream. The wireless communication unit 310 upconverts a baseband signal into an RF band signal, and may transmit the RF band signal through an antenna. The wireless communication unit 310 downconverts an RF band signal, received through the antenna, into a baseband signal.

To this end, the wireless communication unit 310 may include a transmission filter, a reception filter, an amplifier, a mixer, an oscillator, a DAC, an ADC, or the like. Further, the wireless communication unit 310 may include a plurality of transmission/reception paths. In addition, the wireless communication unit 310 may include at least one antenna array including a plurality of antenna elements. From the aspect of hardware, the wireless communication unit 310 may include a digital unit and an analog unit, and the analog unit may include a plurality of sub-units according to operating power, operating frequency, or the like.

As described above, the wireless communication unit 310 transmits and receives a signal. Accordingly, the wireless communication unit 310 may be referred to as a transmitter, a receiver, or a transceiver. In the following description, transmission and reception performed through a wireless channel are to be understood as including processing performed as described above by the wireless communication unit 310.

The backhaul communication unit 320 provides an interface for performing communication with other nodes in a network. That is, the backhaul communication unit 320 converts a bit stream, which is transmitted from the second base station 120 to another node, for example, another access node, another base station, a higher node, a core network, or the like, into a physical signal, and converts a physical signal, which is received from another node, into a bit stream. For example, the backhaul communication unit 320 may convert a bit stream, which is transmitted from the second base station 120 to a first base station 110, into a physical signal and may convert a physical signal, which is received from the first base station 110, into a bit stream.

The storage unit 330 stores data, such as a default program, an application, and setting information, for the operation of the second base station 120. The storage unit 330 may be configured as volatile memory, nonvolatile memory, or a combination of volatile memory and nonvolatile memory. The storage unit 330 provides the stored data in response to a request from the controller 340.

The controller 340 controls the overall operation of the base station. For example, the controller 340 transmits and receives a signal through the wireless communication unit 310 or the backhaul communication unit 320. Further, the controller 340 records and reads data in the storage unit 330. To this end, the controller 340 may include at least one processor. For example, the controller 340 may control the second base station 120 to perform operations according to various embodiments to be described below. In particular, the controller 340 may determine whether to perform retransmission under a certain condition in retransmitting missed data among data transmitted from the second base station 120 to the first base station 110 according to various embodiments to be illustrated below. To this end, the controller 340 may include a retransmission request determination unit 342. For example, the retransmission request determination unit 342 may include an X2-U protocol processing block. The X2-U protocol processing block may determine PDCP PDUs for which retransmission is requested. Here, the retransmission request determination unit 342 is an instruction set or code stored in the storage unit 330 and may be an instruction/code at least temporarily residing in the controller 340, a storage space storing an instruction/code, or part of circuitry forming the controller 340. For example, the controller 340 controls the second base station 120 to perform a procedure according to various embodiments to be illustrated below.

According to various embodiments of the disclosure, data may be transmitted and received through a backhaul connection between the first base station 110 and the second base station 120. According to one embodiment, in dual connectivity, the first base station 110 functions as a master base station and may transmit, to the second base station 120, data to transmit to the terminal 140 in a divided manner. Here, a flow control algorithm is required in order to prevent the overflow or underflow of data in the second base station 120. Hereinafter, the disclosure illustrates a flow control algorithm for preventing overflow or underflow in a secondary base station in dual connectivity and a problem thereof with reference to FIG. 4 and FIG. 5.

According to one embodiment of the disclosure, a flow control algorithm for preventing overflow or underflow in a secondary base station may be performed as follows.

According to an embodiment, a first base station 110 may operate as a master base station, and a second base station 120 may operate as a secondary base station. In this case, in order to prevent the overflow or underflow of data in the second base station 120, the first base station 110 may transmit user data in a request-and-forward manner. In dual connectivity, data is transmitted through a non-ideal backhaul between the first base station 110 and the second base station 120, and thus data loss is likely to occur. Therefore, LTE standards (e.g., TS 36.425) define feedback on missed user data.

Figure 4:
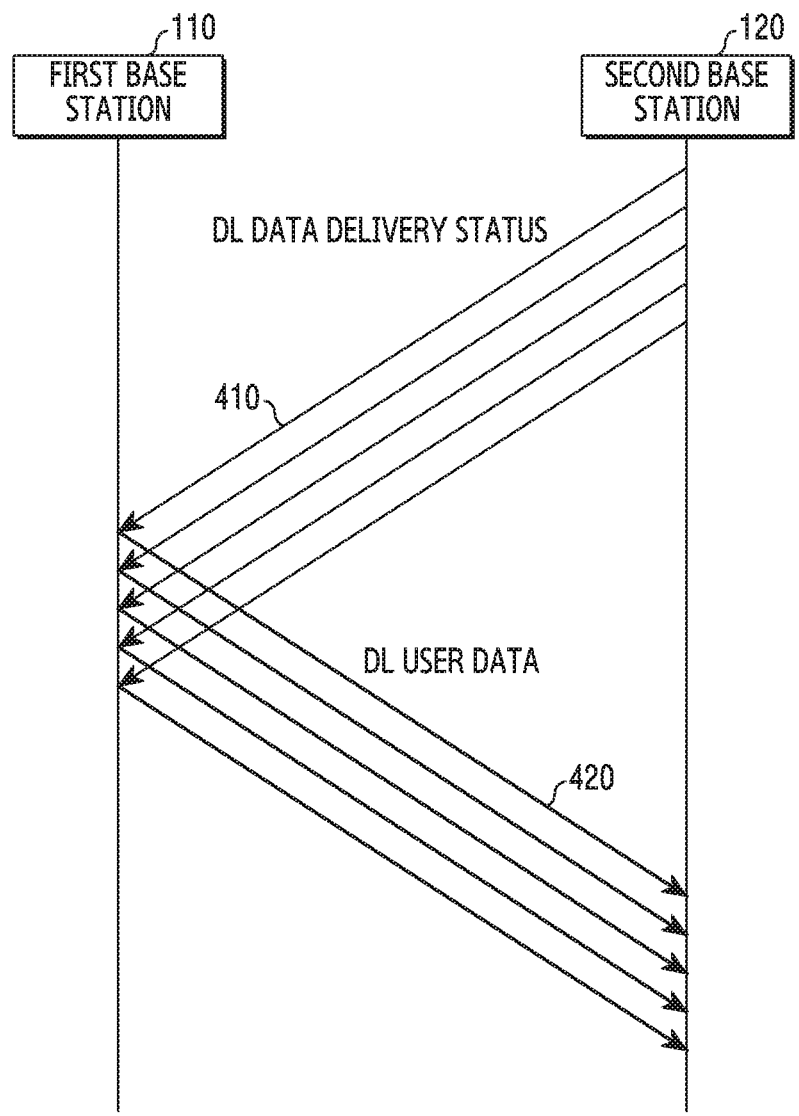
FIG. 4 illustrates a flow control process between a first base station and a second base station in a wireless communication system according to various embodiments of the disclosure.

For example, as illustrated in FIG. 4, the second base station 120 may transmit a DL data delivery status message 410 to the first base station 110. The DL data delivery status message 410 may include feedback on missed user data. For example, the DL data delivery status message 410 may include the details listed in Table 1.

TABLE 1

DL DATA DELIVERY STATUS

Highest successfully delivered PDCP SN
Desired buffer size for the E-RAB
Min desired buffer size for the UE
Num of lost X2-U SN ranges reported
Start of lost X2-U SN range
End of lost X2-U SN range The first base station 110 may retransmit user data missed by the second base station 120 based on the details of the feedback of the DL data delivery status message 410 received from the second base station 120. That is, as illustrated in FIG. 4, the first base station 110 may transmit the missed user data through a DL user data message 420. According to other embodiments, the DL data delivery status message 410 may be received after DL user data is transmitted first. Here, the user data transmitted from the first base station 110 to the second base station 120 through the DL user data message 420 may include a PDCP packet, and the PDCP packet may be enciphered and deciphered based on at least one parameter. The PDCP packet may include a PDCP PDU. One of parameters used for enciphering/deciphering the PDCP packet may be defined as illustrated in FIG. 5.

Figure 5:
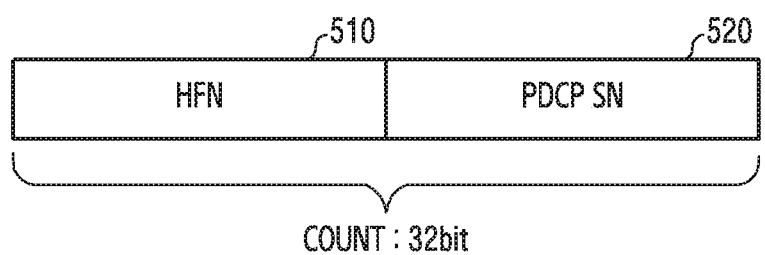
FIG. 5 illustrates the structure of a parameter used for packet data convergence protocol (PDCP) enciphering and deciphering in a wireless communication system according to various embodiments of the disclosure.

Referring to FIG. 5, a count value may be defined as one of parameters used for PDCP enciphering and deciphering. The count value includes a combination of an HFN 510 and a PDCP SN 520. According to one embodiment, the count value may have 32 bits. For example, the value of the PDCP SN may be included in a header of the PDCP packet and may be increased by 1 for each PDU. The HFN may be calculated by each of a base station and a terminal. Specifically, according to an overflow counter mechanism, when the PDCP SN reaches the maximum value, the next PDCP SN may be 0, and the HFN may be increased by one.

Referring to FIG. 4, when all or part of a DL user data message transmitted from the first base station 110 to the second base station 120 is missed, the second base station 120 may transmit a DL data delivery status message 410 including data loss information to the first base station 110. Upon receiving the DL data delivery status message 410, the first base station 110 may retransmit a corresponding PDU using a DL user data message 420. Here, when the difference between the PDCP SN of the retransmitted PDU and a PDCP SN already received by the terminal is equal to or greater than a reordering window value, the HFN is increased by 1 in the terminal according to the overflow counter mechanism, which may cause HFN de-synchronization. That is, since it is impossible to distinguish the retransmitted PDU, the terminal increases the HFN by 1, while the base station maintains the previous HFN. Thus, there may be de-synchronization between the HFN value of the terminal and the HFN value of the base station. Here, the reordering window value may be half of the size allocated to the PDCP SN (=PDCP SN space/2).

When there is de-synchronization between the HFN value of the terminal and the HFN value of the base station, count values used by the terminal and the base station are also different. That is, since a count value as a parameter used by the base station for enciphering and a count value as a parameter used by the terminal for deciphering are different, the terminal fails in deciphering. Accordingly, a radio bearer between the terminal and the base stations is reestablished in order to resolve de-synchronization in enciphering parameters, and de-synchronization in enciphering parameters may have an adverse effect on user-experienced communication quality and operator key performance indicators (KPI).

As described above, in a split bearer situation based on dual connectivity, when the first base station 110 transmits, to the second base station 120, data to be transmitted to the terminal 140, data loss may occur due to a non-ideal backhaul environment. Accordingly, data retransmission may be performed and may result in HFN de-synchronization described above, thus causing deterioration in communication quality. Therefore, the disclosure proposes a technique for excluding a PDCP PDU that may cause HFN de-synchronization in the terminal among PDCP PDUs requiring retransmission from the first base station 110 to the second base station 120. That is, the disclosure proposes a method available without a protocol change to prevent HFN de-synchronization and to enable inter-operation with other vendors.

According to various embodiments of the disclosure, a procedure in which a master base station retransmits data in order to prevent enciphering parameter de-synchronization in the event of data loss due to a non-ideal backhaul between the master base station and a secondary base station may be performed as illustrated in FIG. 6 to FIG. 9.

Figure 6:
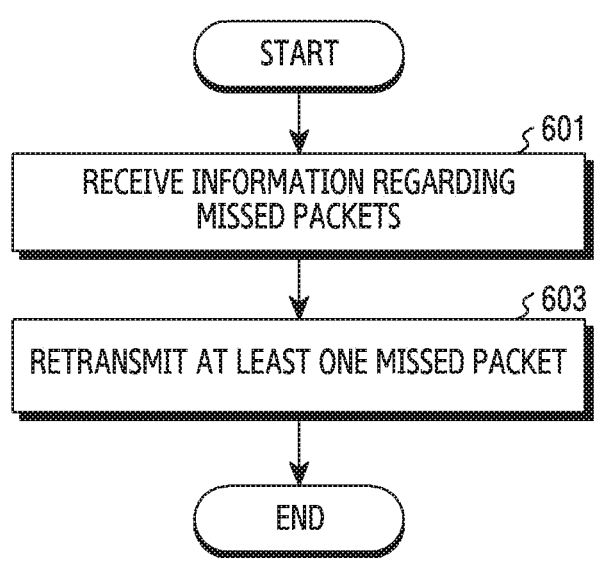
FIG. 6 illustrates an operating method of a base station retransmitting user data in a wireless communication system according to various embodiments of the disclosure.

FIG. 6 illustrates an operating method of a base station retransmitting user data in a wireless communication system according to various embodiments of the disclosure. For example, FIG. 6 illustrates an operating method of a first base station 110.

Referring to FIG. 6, in operation 601, the base station receives information regarding missed packets from a different base station (e.g., a second base station 120). That is, the base station receives the information regarding the missed packets, which the different base station has not received, among packets transmitted to the different base station. For example, the base station receives information regarding missed packets, which the different base station has not received, from the different base station. In this case, the information regarding the missed packets may include identification numbers of the missed packets.

In operation 603, the base station retransmits at least one missed packet among the missed packets to the different base station based on the received information. For example, the base station determines to retransmit at least one missed packet among the missed packets based on the information regarding the missed packets received from the another base station and transmits the determined at least one missed packet to the another base station. In this case, the at least one missed packet may be determined based on the difference value between the identification numbers of the missed packets and the identification number of the last packet transmitted to the another base station. According to other embodiments, the base station may determine a missed packet not to be retransmitted among the missed packets and may retransmit at least one missed packet by excluding the determined missed packet from retransmission. Here, the base station may exclude missed packets not to be retransmitted from retransmission based on the difference value between the identification numbers of the missed packets and the identification number of the last packet transmitted to the another base station. According to other embodiments, the base station may determine a missed packet not to be retransmitted by comparing the difference value between the identification numbers of the missed packets and the identification number of the last packet transmitted to the another base station with a threshold value.

Figure 7:
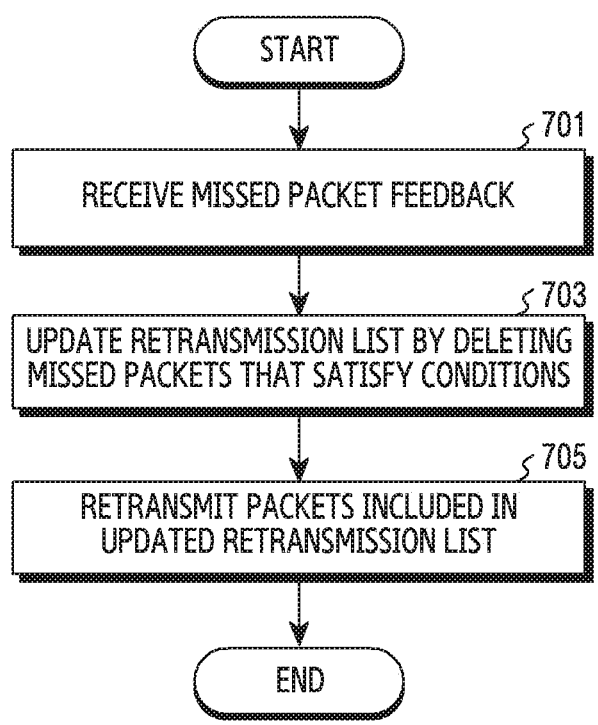
FIG. 7 illustrates an operating method of a base station transmitting user data to a different base station in a wireless communication system according to various embodiments of the disclosure.

FIG. 7 illustrates an operating method of a base station transmitting user data to another base station in a wireless communication system according to various embodiments of the disclosure. For example, FIG. 7 illustrates an operating method of a first base station 110, serving as a master base station. The first base station 110 may be a macrocell base station.

Referring to FIG. 7, in operation 701, the base station receives feedback on a missed packet list from the another base station (e.g., a second base station 120). The base station may transmit user data to the another base station before receiving the feedback on the missed packet list. For example, the base station receives feedback on a missed packet list from the another base station. The feedback on the missed packet list may include missed packet identification number information regarding the user data transmitted by the base station to the another base station.

In operation 703, the base station deletes a missed packet that satisfies a preset condition and updates a retransmission list. That is, to prevent enciphering parameter de-synchronization, the base station deletes at least one missed packet from the retransmission list according to the preset condition. Specifically, when the difference between the identification number of a missed packet and the identification number of the last packet transmitted to the another base station exceeds a threshold value, the base station may delete the missed packet from the retransmission list. Here, the threshold value may be determined based on the difference value identification numbers that cause an increase in enciphering parameter (e.g., HFN). For example, the threshold value may be determined based on a reordering window size.

In operation 705, the base station retransmits a packet included in the updated retransmission list. That is, the base station retransmits corresponding packets to the another base station according to the retransmission list updated by deleting the missed packet in operation 703. That is, the base station retransmits packets included in the retransmission list to the another base station according to the retransmission list determined based on the difference between the identification number of the missed packet and the identification number of the last packet transmitted to the another base station.

Figure 8:
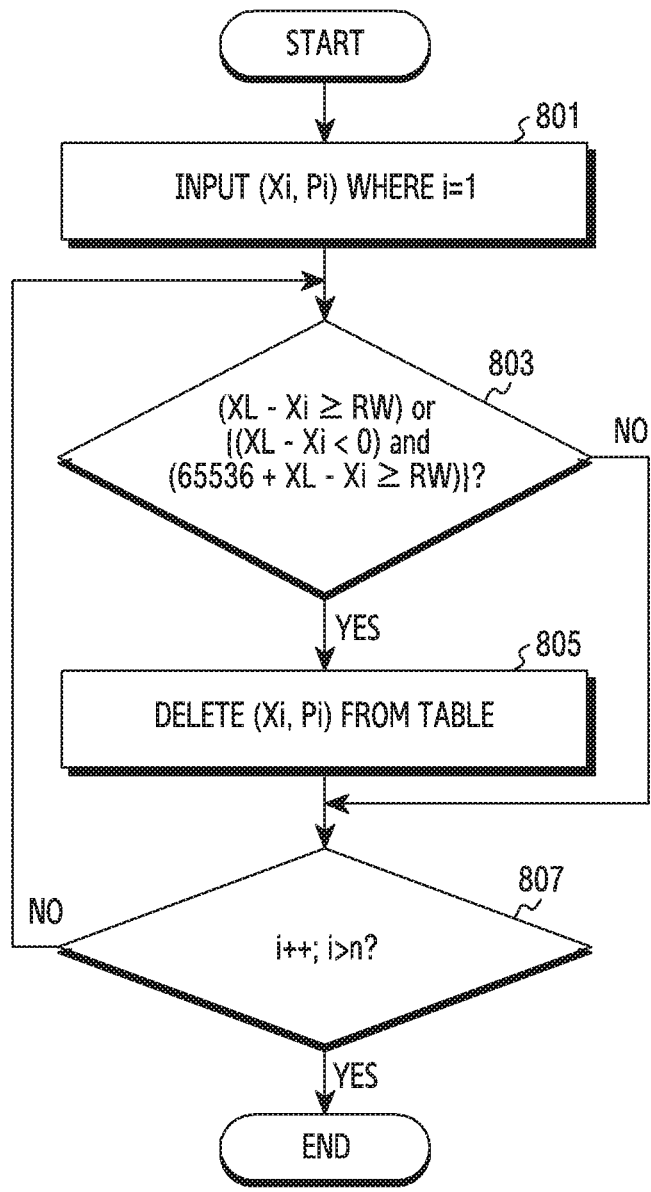
FIG. 8 illustrates an operating method of a base station determining whether to retransmit user data between base stations in a dual-connectivity situation in a wireless communication system according to various embodiments of the disclosure.

FIG. 8 illustrates an operating method of a base station determining whether to retransmit user data between base stations in a dual-connectivity situation in a wireless communication system according to various embodiments of the disclosure. That is, FIG. 8 illustrates a process in which a master base station determines whether to delete each identification number of a missed packet list that is fed back from a retransmission list. FIG. 8 illustrates an operating method of a first base station 110 operating as a master base station in a dual-connectivity situation. The first base station 110 may be a macrocell base station.

Referring to FIG. 8, in operation 801, the base station determines whether to perform retransmission for each identification number by inputting each identification number of a missed packet list that is fed back. That is, the base station starts a process of determining whether a preset condition is satisfied using the identification number of a missed packet fed back from another base station (e.g., a second base station 120).

For example, the base station generates a table as illustrated in Table 2 using feedback information input from the another base station. That is, the base station may receive feedback of a lost X2-U SN from the another base station and may generate the table illustrated in Table 2 based on PDCP SN information corresponding to the X2-U SN. The X2-U SN may be a value corresponding one to one with a PDCP SN and is information used as the identification number of a packet in an X2-UP protocol. Since the X2-U SN may have one-to-one correspondence with the PDCP SN, an algorithm of the disclosure may use X2-U SN information instead of the PDCP SN in a method for preventing enciphering parameter de-synchronization. The base station starts the algorithm for determining whether to retransmit each identification number from (X1, P1) where i=1 by inputting a pair of the X2-U SN and the PDCP SN, (Xi, Pi).

TABLE 2

| Lost X2-U SN | PDCP SN |
|---|---|
| X1 | P1 |
| X2 | P2 |
| ... | ... |
| Xn | Pn |

In operation 803, the base station determines whether the input identification number satisfies the preset condition. That is, the base station determines whether the identification number of the input pair (Xi, Pi) satisfies the preset condition. The base station determines whether the identification number of a missed packet satisfies the condition based on the difference value between the identification number of the missed packet and the identification number of the last initially transmitted packet transmitted to the another base station.

Specifically, the base station determines whether input (Xi, Pi) satisfies Equation 1.

$$(XL-Xi \geq RW) \text{ or } \{(XL-Xi<0) \text{ and } (65536+XL-Xi \geq RW)\} \quad \text{Equation 1}$$

In Equation 1, XL may be defined as the X2-U SN of last initially transmitted DL user data transmitted from the base station to the another base station. Since retransmitted DL USER data is not updated as last transmitted DL user data, XL may be defined as the X2-U SN of the last initially transmitted DL user data. Xi indicates the identification number of an i-th missed packet. That is, Xi may be defined as an i-th X2-U SN in a lost X2-U SN table. In addition, RW denotes a PDCP reordering window value and may be defined as, for example, half of the PDCP SN size (PDCP SN space/2).

In Equation 1, when the difference between XL, which is the X2-U SN of the last initially transmitted DL user data, and Xi is equal to or greater than the reordering window value RW, if receiving a PDCP SN value corresponding to Xi, a terminal increases an HFN by 1 according to an overflow counter mechanism. In this case, since HFN de-synchronization occurs between the terminal and the base station, (Xi, Pi) needs to be excluded from a retransmission list in order to avoid the de-synchronization. In Equation 1, when the difference between XL and Xi is less than 0 and the difference between XL and Xi plus 65536 is equal to or greater than the reordering window value, if receiving the PDCP SN value corresponding to Xi, the terminal also increases the HFN by 1 according to an overflow counter mechanism. In this case, since HFN de-synchronization also occurs between the terminal and the base station, (Xi, Pi) needs to be excluded from the retransmission list in order to avoid the de-synchronization. A difference between XL and Xi of less than 0 indicates that the last transmitted XL is smaller than Xi since the last transmitted XL exceeds the maximum value of the X2-U SN and is thus numbered from 0 again. According to one embodiment, when the X2-U SN is 16 bits, a difference value between XL and Xi plus 65536 that is equal to or greater than the reordering window value indicates that HFN de-synchronization may also occur.

When (Xi, Pi) satisfies the condition of Equation 1, the base station performs operation 805. When (Xi, Pi) does not satisfy the condition of Equation 1, the base station performs operation 807.

In operation 805, the base station deletes input (Xi, Pi) from a retransmission table. That is, when it is determined that (Xi, Pi) satisfies the condition of Equation 1, the base station deletes (Xi, Pi) from the retransmission list. In other words, when it is determined that (Xi, Pi) satisfies the condition of Equation 1, the base station deletes (Xi, Pi) from the retransmission list in order to prevent HFN de-synchronization in the terminal and to avoid retransmitting a packet of the identification number.

In operation 807, the base station increases an index i by 1 and determines whether the increased value of i is greater than n. That is, the base station increases the index i by 1 and determines whether i is greater than n, which is the last index of the missed packet list. In order to determine whether all identification numbers of the missed packet list satisfy the condition of Equation 1, the base station increases the index i, for which retransmission has been determined, by 1 and identifies whether retransmission up to the last index n is determined. When i increased by 1 is less than or equal to n, the base station returns to operation 803 and determines whether (Xi, Pi) where i is increased satisfies Equation 1. When i is greater than n, the base station terminates the algorithm. When the algorithm is terminated, the base station may perform data retransmission using the updated retransmission list.

Figure 9:
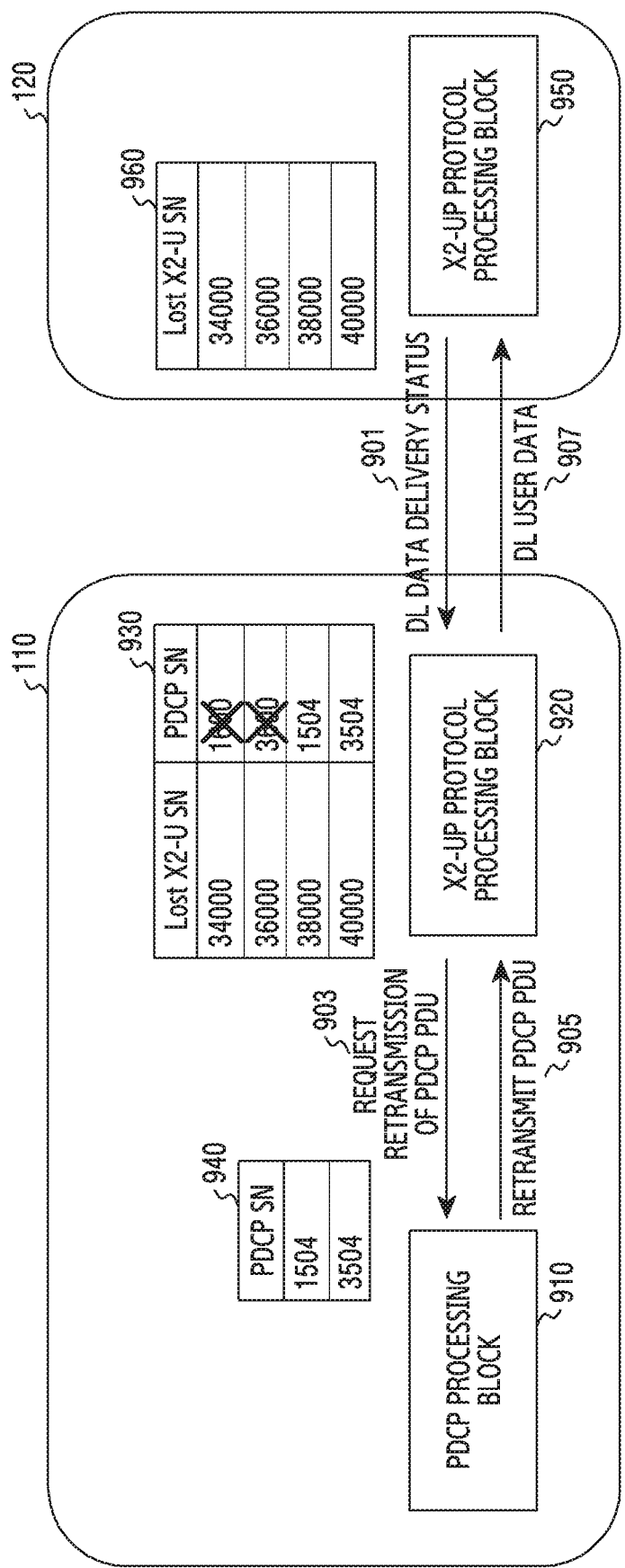
FIG. 9 illustrates an example of retransmitting user data between base stations in a dual-connectivity situation in a wireless communication system according to various embodiments of the disclosure.

FIG. 9 illustrates an example of retransmitting user data between base stations in a dual-connectivity situation in a wireless communication system according to various embodiments of the disclosure. FIG. 9 illustrates retransmission according to the embodiments illustrated above in FIG. 6 to FIG. 8. FIG. 9 illustrates an operating method of internal blocks of a first base station 110 operating as a master base station and a second base station 120 operating as a secondary base station in a dual-connectivity situation. The first base station 110 may be a macrocell base station, and the second base station 120 may be a small cell base station. According to one embodiment, the first base station 110 may include a PDCP processing block 910 and an X2-UP protocol processing block 920. According to other embodiments, a retransmission determination unit 242 may operate as one block including the functions of the PDCP processing block 910 and the X2-UP protocol processing block 920. The second base station 120 may include an X2-UP protocol processing block 950.

Referring to FIG. 9, in operation 901, a base station receives feedback about missed data from another base station. That is, the first base station 110 receives feedback about the identification number of missed data from the second base station 120. For example, the X2-UP protocol processing block 920 receives a DL data delivery status message of an X2-UP protocol from the X2-UP protocol processing block 950, and the DL data delivery status message may include the information shown in Table 1.

According to one embodiment, the X2-UP protocol processing block 950 may generate a lost X2-U SN table as illustrated in Table 2. An X2-U SN may be identification number information included in a header of a packet in the X2-UP protocol.

TABLE 3

| Lost X2-U SN |
|---|
| X1 |
| X2 |
| ... |
| Xn |

For example, the X2-UP protocol processing block 950 updates a lost X2-U SN table 960 with respect to data not received from the first base station 110 based on the X2-U SN. That is, the X2-UP protocol processing block 950 may determine whether there is a missing X2-U SN with respect to an X2-UP packet received from the first base station 110, and may update the lost X2-U SN table 960, considering the missing X2-U SN to be missed. The X2-UP protocol processing block 950 transmits a DL data delivery status message 901 including missed X2-U SN information to the X2-UP protocol processing block 920.

According to one embodiment of the disclosure, whenever the first base station 110 receives a DL data delivery status message from the second base station 120, the first base station 110 may determine whether a preset condition is satisfied and may update a missed data table. Upon receiving feedback about the missed X2-U SN information from the X2-UP protocol processing block 950, the X2-UP protocol processing block 920 may generate a missed data table, as shown in Table 2, or may update an already generated table. For example, the X2-UP protocol processing block 920 may update the lost X2-U SN table from 'Number of Lost X2-U Sequence Number Ranges Reported', 'Start of Lost X2-U Sequence Number Range', and 'End of X2-U Sequence Number Range' fields included in the DL data delivery status message received from the X2-UP protocol processing block 950. The X2-UP protocol processing block 920 may generate a table 930 including a lost X2-U SN and corresponding PDCP SN information based on the missed X2-U SN information. The X2-UP protocol processing block 920 may perform operations 801 to 807 described above in order to generate the missed data table 930 including a pair of an X2-U SN and a PDCP SN fed back from the X2-UP protocol processing block 950.

According to one embodiment, the X2-UP protocol processing block 920 may determine an $(Xi, Pi)$ pair that satisfies Equation 1. Here, in Equation 1, XL may be defined as the X2-U SN of the last initially transmitted DL user data transmitted from the first base station 110 to the second base station 120. Since retransmitted DL user data is not updated as the last transmitted DL user data, XL may be defined as the X2-U SN of the last initially transmitted DL user data. In addition, RW denotes a PDCP reordering window value and may be defined as, for example, half of a PDCP SN size (PDCP SN space/2).

In Equation 1, when the difference between XL, which is the X2-U SN of the last initially transmitted DL user data, and Xi is equal to or greater than the reordering window value RW, upon receiving a PDCP SN value corresponding to Xi, a terminal increases an HFN by 1 according to an overflow counter mechanism, and thus HFN de-synchronization may occur. Therefore, the X2-UP protocol processing block 920 deletes $(Xi, Pi)$ from a retransmission list in order to prevent this de-synchronization. In Equation 1, when the difference between XL and Xi is less than 0 and the difference between XL and Xi plus 65536 is equal to or greater than the reordering window value, if receiving the PDCP SN value corresponding to Xi, the terminal also increases the HFN by 1 according to the overflow counter mechanism, and thus HFN de-synchronization may occur. In this case, the X2-UP protocol processing block 920 also deletes $(Xi, Pi)$ from the retransmission list. That is, the X2-UP protocol processing block 920 may determine not to retransmit a missed packet that may cause HFN de-synchronization, thereby preventing HFN de-synchronization in advance.

In other words, as described above in connection with operations 801 to 807, the X2-UP protocol processing block 920 determines whether the $(Xi, Pi)$ pair satisfies Equation 1 by increasing i from 1 to n. The X2-UP protocol processing block 920 deletes $(Xi, Pi)$ satisfying the condition of Equation 1 from the retransmission list. As a result, the X2-UP protocol processing block 920 may finally obtain the table 930 including a pair of a lost X2-U SN and a PDCP SN.

Specifically, referring to the table 930 in FIG. 9, the case where XL is 40040, RW is 2048, and n is 4 is illustrated. In this case, the X2-UP protocol processing block 920 determines whether all values in the lost X2-U SN table received from the X2-UP protocol processing block 950 satisfy Equation 1. The X2-UP protocol processing block 920 may perform operations 801 to 807 in order to determine an X2-U SN to exclude from retransmission.

In operation 801, the X2-UP protocol processing block 920 starts the algorithm by inputting $(X1, P1)=(34000, 1600)$ where i=1. In operation 803, the X2-UP protocol processing block 920 determines whether $(X1, P1)=(34000, 1600)$ satisfies the condition of Equation 1. The X2-UP protocol processing block 920 determines that the condition is satisfied because XL-X1 is equal to 6040 and is greater than RW 2048. In operation 805, the X2-UP protocol processing block 920 deletes $(X1, P1)=(34000, 1600)$ from the table 930. In operation 807, the X2-UP protocol processing block 920 increases i by 1 and returns to operation 803 upon determining that i=2 is smaller than n=4.

In operation 803, the X2-UP protocol processing block 920 determines whether $(X2, P2)=(36000, 3600)$ satisfies the condition of Equation 1. The X2-UP protocol processing block 920 determines that the condition is satisfied because XL-X2 is equal to 4040 and is greater than RW 2048. In operation 805, the X2-UP protocol processing block 920 deletes $(X2, P2)=(36000, 3600)$ from the table 930. In operation 807, the X2-UP protocol processing block 920 increases i by 1, and returns to operation 803 upon determining that i=3 is smaller than n=4.

In operation 803, the X2-UP protocol processing block 920 determines whether $(X3, P3)=(38000, 1504)$ satisfies the condition of Equation 1. The X2-UP protocol processing block 920 determines that the condition is not satisfied because XL-X3 is equal to 2040 and is smaller than RW 2048. The X2-UP protocol processing block 920 immediately proceeds to operation 807. In operation 807, the X2-UP protocol processing block 920 increases i by 1, and returns to operation 803 upon determining that i=4 is equal to n=4.

In operation 803, the X2-UP protocol processing block 920 determines whether $(X4, P4)=(40000, 3504)$ satisfies the condition of Equation 1. The X2-UP protocol processing block 920 determines that the condition is not satisfied because XL-X4 is equal to 40 and is smaller than RW 2048. The X2-UP protocol processing block 920 immediately proceeds to operation 807. In operation 807, the X2-UP protocol processing block 920 increases i by 1, and terminates the algorithm as determining that i=5 is greater than n=4.

Accordingly, after terminating the algorithm for determining retransmission according to operations 801 to 807, the X2-UP protocol processing block 920 deletes (34000, 1600) and (36000, 3600), which are $(Xi, Pi)$ pairs satisfying the condition of Equation 1, thereby updating the table 930.

Subsequently, in operation 903, the X2-UP protocol processing block 920 requests the PDCP processing block 910 to retransmit a PDCP PDU based on the updated table 930. That is, the X2-UP protocol processing block 920 may transmit a retransmission table 940 including PDCP SN information for which retransmission is requested in the updated table 930 to the PDCP processing block 910. The X2-UP protocol processing block 920 transmits the PDCP SN information for which retransmission is requested to the PDCP processing block 910 through a PDCP PDU retransmission request.

In operation 905, the PDCP processing block 910 retransmits a requested PDCP PDU to the X2-UP protocol processing block 920 based on the retransmission table 940 received from the X2-UP protocol processing block 920. That is, the PDCP processing block 910 transmits a PDCP PDU corresponding to a PDCP SN included in the retransmission table 940 to the X2-UP protocol processing block 920.

In operation 907, the X2-UP protocol processing block 920 includes the received PDCP PDU in a DL user data message and transmits the DL user data message to the X2-UP protocol processing block 950 of the second base station 120.

According to other embodiments, the PDCP processing block 910 and the X2-UP protocol processing block 920 may form one block. For example, when the retransmission determination unit 242 includes the functions of the PDCP processing block 910 and the X2-UP protocol processing block 920, the retransmission determination unit 242 may omit operations 903 and 905. That is, the retransmission determination unit 242 may update the table 930 through operations 801 to 807 and may retransmit a PDCP PDU to the second base station 120 according to a PDCP SN in the updated table 930. That is, the retransmission determination unit 242 may transmit DL user data including PDCP PDUs to be retransmitted to the second base station 120.

According to various embodiments of the disclosure, a procedure in which a secondary base station requests retransmission of data in order to prevent enciphering parameter de-synchronization in the event of data loss due to a non-ideal backhaul between a master base station and the secondary base station may be performed as illustrated in FIG. 10 to FIG. 13.

Figure 10:
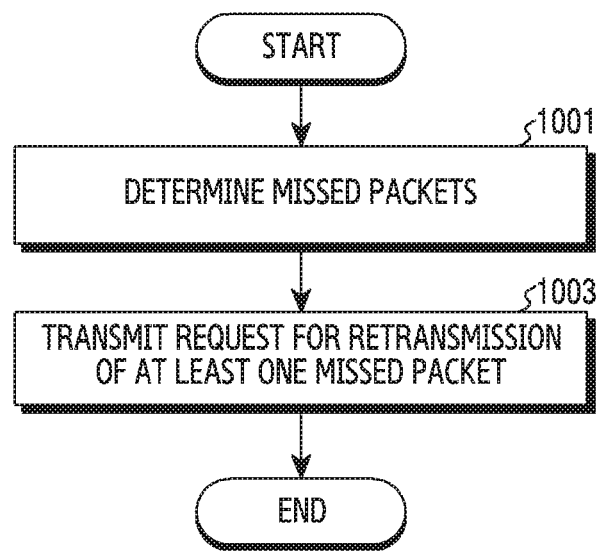
FIG. 10 illustrates an operating method of a base station requesting retransmission of user data in a wireless communication system according to various embodiments of the disclosure.

FIG. 10 illustrates an operating method of a base station requesting retransmission of user data in a wireless communication system according to various embodiments of the disclosure. For example, FIG. 10 illustrates an operating method of a second base station 120.

Referring to FIG. 10, in operation 1001, the base station determines missed packets based on a packet received from another base station (e.g., a first base station 110). That is, the base station receives a packet from the another base station and determines missed packets based on information regarding the received packet. For example, the base station determines missed packets by comparing the identification numbers of packets received from the another base stations.

In operation 1003, the base station transmits a request for retransmission of at least one missed packet among the missed packets to the another base station. For example, the base station may determine to request retransmission of at least one missed packet among the missed packets and may transmit a request for retransmission of the determined at least one missed packet to the another base station. Here, the base station may determine at least one missed packet for which retransmission is requested based on the difference value between the identification numbers of the missed packets and the identification number of the last packet received from the another base station. According to other embodiments, the base station may determine a missed packet for which retransmission is not requested among the missed packets and may exclude the determined missed packet from a retransmission request, thereby requesting retransmission of at least one missed packet. Here, the base station may exclude missed packets for which retransmission is not requested from the retransmission request based on the difference value between the identification numbers of the missed packets and the identification number of the last packet received from the another base station. According to other embodiments, the base station may determine a missed packet for which retransmission is not requested by comparing the difference value between the identification numbers of the missed packets and the identification number of the last packet received from the another base station with a threshold value.

Figure 11:
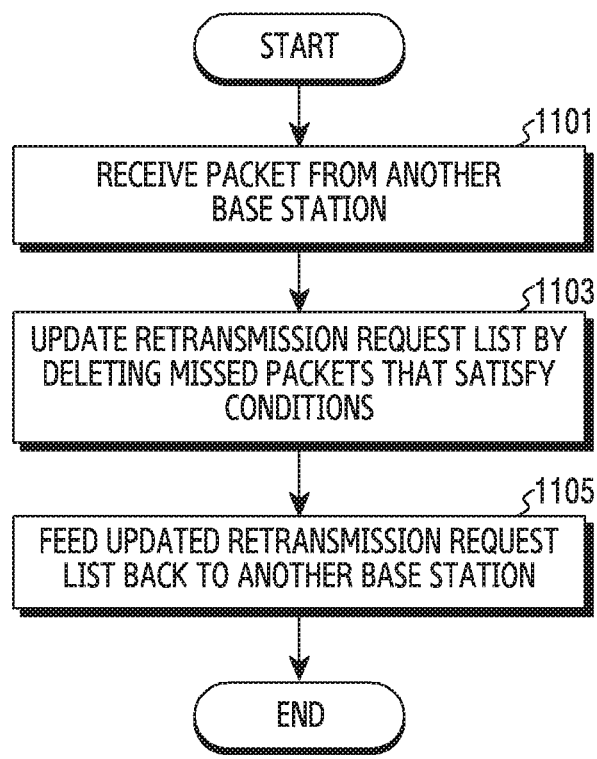
FIG. 11 illustrates an operating method of a base station receiving user data from a different base station in a wireless communication system according to various embodiments of the disclosure.

FIG. 11 illustrates an operating method of a base station receiving user data from another base station in a wireless communication system according to various embodiments of the disclosure. For example, FIG. 11 illustrates an operating method of a second base station 120 as a secondary base station. The second base station 120 may be a small cell base station.

Referring to FIG. 11, in operation 1101, the base station receives a data packet from another base station (e.g., a first base station 110). That is, the base station receives user data from the another base station.

In operation 1103, the base station deletes a missed packet that satisfies a preset condition, thereby updating a retransmission request list. That is, the base station deletes the missed packet from the retransmission request list according to the preset condition in order to prevent enciphering parameter de-synchronization. Specifically, when the difference between the identification number of the missed packet and the identification number of the last packet received from the another base station exceeds a threshold value, the base station may delete the missed packet from the retransmission request list. Here, the threshold value may be determined based on the difference value between identification numbers that causes an increase in enciphering parameter (e.g., HFN). For example, the threshold value may be determined based on a reordering window size.

In operation 1105, the base station feeds back the updated retransmission request list to the another base station. That is, the base station transmits the retransmission request list, which is updated by deleting the missed packet in operation 1103, to the another base station. In other words, the base station transmits the retransmission request list, determined based on the difference between the identification number of the last packet received from the another base station and the identification number of the missed packet, to the another base station.

Figure 12:
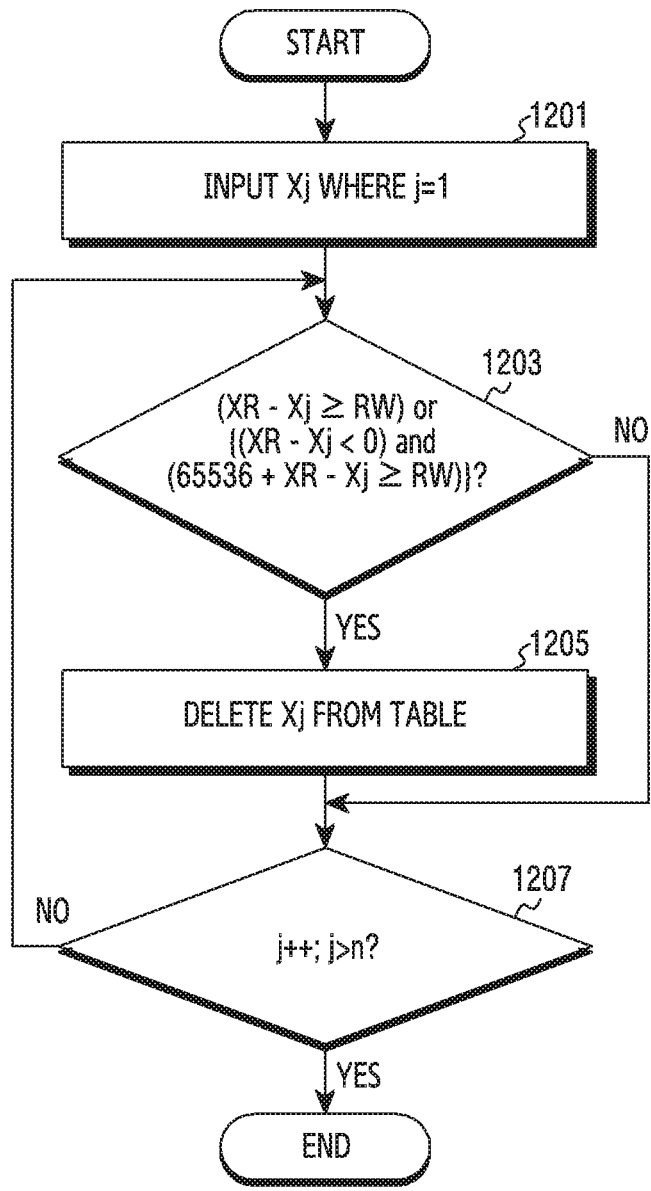
FIG. 12 illustrates an operating method of a base station determining whether to request retransmission of user data between base stations in a dual-connectivity situation in a wireless communication system according to various embodiments of the disclosure.

FIG. 12 illustrates an operating method of a base station determining whether to request retransmission of user data between base stations in a dual-connectivity situation in a wireless communication system according to various embodiments of the disclosure. That is, FIG. 12 illustrates a process in which a secondary base station determines whether to delete each identification number of a missed packet list from a retransmission request list. FIG. 12 illustrates an operating method of a second base station 120 operating as a secondary base station in a dual-connectivity situation. The second base station 120 may be a small cell base station.

Referring to FIG. 12, in operation 1201, the base station determines whether to request retransmission for each identification number by inputting each identification number of a missed packet list. That is, the base station generates a missed packet list based on the identification number of a packet received from another base station (e.g., a first base station 110) and starts a process of determining whether a preset condition is satisfied using the identification number of a missed packet. The base station may receive user data from the another base station before starting operation 1201 and may generate the missed packet list based on the identification number of the received packet. According to one embodiment, the base station may receive a DL user data message of the X2-UP protocol from the another base station and may add a missing X2-U SN to the missed packet list based on an X2-U SN.

For example, the base station generates a lost X2-U SN table as illustrated in Table 3. That is, the base station may update the lost X2-U SN table illustrated in Table 3 with respect to data not received based on the X2-U SN whenever DL user data is received from the another base station. The X2-U SN may be a value corresponding one to one with a PDCP SN and is information used as the identification number of a packet in the X2-UP protocol. Since the X2-U SN may have one-to-one correspondence with the PDCP SN, an algorithm of the disclosure may use X2-U SN information instead of the PDCP SN in a method for preventing enciphering parameter de-synchronization. The base station starts the algorithm for determining whether to request retransmission of each identification number from X1 where j=1 by inputting Xj defined as the X2-U SN.

In operation 1203, the base station determines whether the input identification number satisfies the preset condition. That is, the base station determines whether the input identification number Xj satisfies the preset condition. The base station determines whether the identification number of a missed packet satisfies the condition based on the difference value between the identification number of the missed packet and the identification number of the last packet received from the another base station.

Specifically, the base station determines whether input Xj satisfies Equation 2.

$$(XR-Xj \geq RW) \text{ or } \{(XR-Xj<0) \text{ and } (65536+XR-Xj \geq RW)\} \quad \text{Equation 2}$$

In Equation 2, XR may be defined as the last X2-U SN of DL user data received by the base station from the another base station. Xj indicates the identification number of a j-th missed packet. That is, Xj may be defined as a j-th X2-U SN in the lost X2-U SN table. In addition, RW denotes a PDCP reordering window value and may be defined as, for example, half of a PDCP SN size (PDCP SN space/2).

In Equation 2, when the difference between XR, which is the last received X2-U SN, and Xj is equal to or greater than the reordering window value RW, if receiving a PDCP SN value corresponding to Xj, a terminal increases an HFN by 1 according to an overflow counter mechanism. In this case, since HFN de-synchronization occurs between the terminal and the base station, Xj needs to be excluded from a retransmission request list in order to avoid the de-synchronization. In Equation 2, when the difference between XR and Xj is less than 0 and the difference between XR and Xj plus 65536 is equal to or greater than the reordering window value, if receiving the PDCP SN value corresponding to Xj, the terminal also increases the HFN by 1 according to an overflow counter mechanism. In this case, since HFN de-synchronization also occurs between the terminal and the base station, Xj needs to be excluded from the retransmission request list in order to avoid the de-synchronization. A difference between XR and Xj of less than 0 indicates that the last transmitted XR is smaller than Xj since the last transmitted XR exceeds the maximum value of the X2-U SN and is thus numbered from 0 again. According to one embodiment, when the X2-U SN is 16 bits, a difference value between XR and Xj plus 65536 that is equal to or greater than the reordering window value indicates that HFN de-synchronization may also occur.

When Xj satisfies the condition of Equation 2, the base station performs operation 1205. When Xj does not satisfy the condition of Equation 2, the base station performs operation 1207.

In operation 1205, the base station deletes the input value Xj from a retransmission request table. That is, when it is determined that Xj satisfies the condition of Equation 2, the base station deletes Xj from the retransmission request list. In other words, when it is determined that Xj satisfies the condition of Equation 2, the base station deletes Xj from the retransmission request list in order to prevent HFN de-synchronization in the terminal and to avoid requesting retransmission of a packet corresponding to the identification number.

In operation 1207, the base station increases an index j by 1 and determines whether the increased value of j is greater than n. That is, the base station increases the index j by 1 and determines whether j is greater than n, which is the last index of the missed packet list. In order to determine whether all identification numbers of the missed packet list satisfy the condition of Equation 2, the base station increases the index j, for which retransmission has been determined, by 1 and identifies whether retransmission up to the last index n is determined. When j increased by 1 is less than or equal to n, the base station returns to operation 1203 and determines whether Xj where j is increased satisfies Equation 2. When j is greater than n, the base station terminates the algorithm. When the algorithm is terminated, the base station may transmit updated retransmission request list information to the another base station according to a predetermined period or condition.

Figure 13:
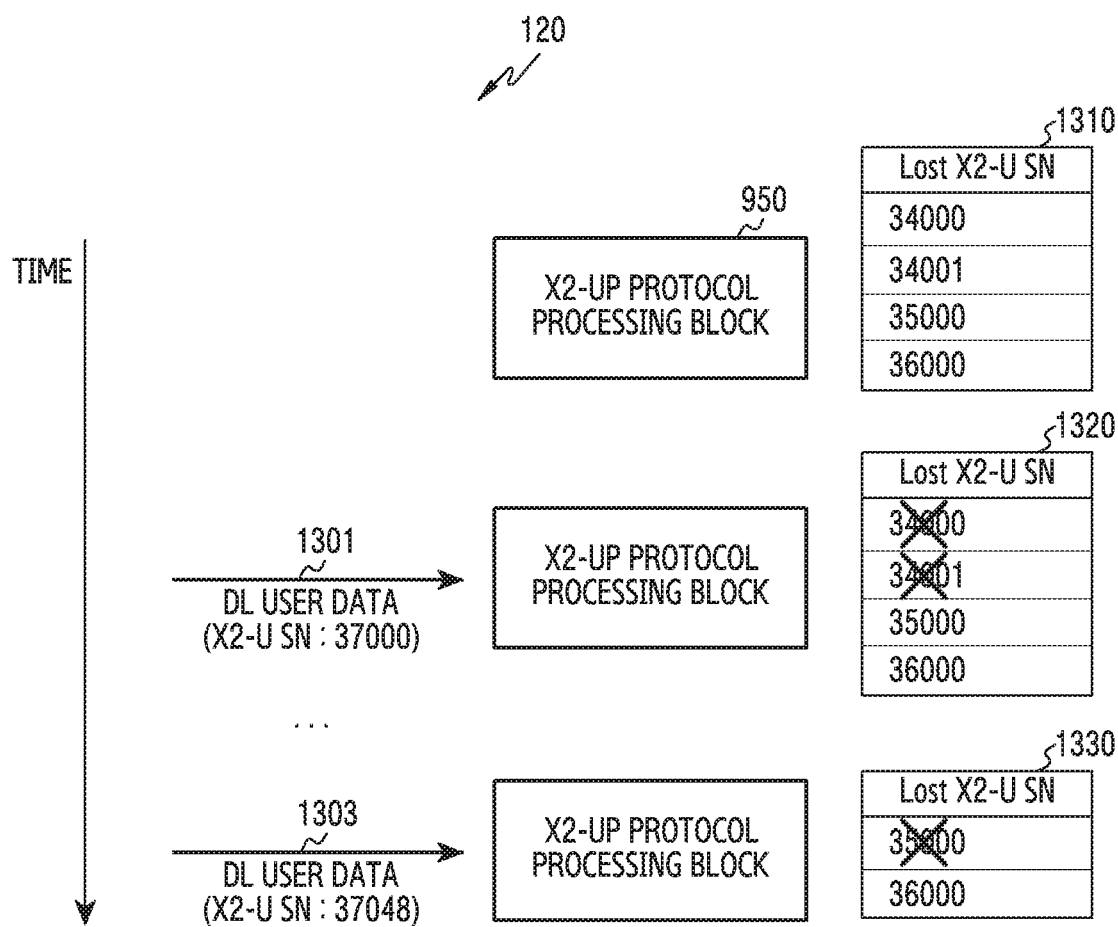
FIG. 13 illustrates an example of requesting retransmission of user data between base stations in a dual-connectivity situation in a wireless communication system according to various embodiments of the disclosure.

FIG. 13 illustrates an example of requesting retransmission of user data between base stations in a dual-connectivity situation in a wireless communication system according to various embodiments of the disclosure. FIG. 13 illustrates a retransmission request according to the embodiments illustrated above in FIG. 10 to FIG. 12. FIG. 13 illustrates an operating method of internal blocks of a second base station 120 operating as a secondary base station in a dual-connectivity situation. The second base station 120 may be, for example, a small cell base station. According to one embodiment, the second base station 120 may include an X2-UP protocol processing block 950. A retransmission request determination unit 342 may include the function of the X2-UP protocol processing block 950.

Referring to FIG. 13, in operation 1301, the X2-UP protocol processing block 950 receives a DL user data message from a first base station 110. The X2-UP protocol processing block 950 may receive a DL user data message from an X2-UP protocol processing block 920 of the first base station 110.

According to one embodiment, the X2-UP protocol processing block 950 may update a lost X2-U SN table whenever DL user data is received. That is, the X2-UP protocol processing block 950 may update a lost X2-U SN table 1310 to a lost X2-U SN table 1320 by performing operations 1201 to 1207. For example, the X2-UP protocol processing block 950 may receive a DL user data message from the first base station 110 before operation 1301 and may compare an X2-U SN included in the DL user data message, thereby generating the lost X2-U SN table 1310 based on missing X2-U SN information.

According to one embodiment, the X2-UP protocol processing block 950 may determine Xj satisfying Equation 2 to update the lost X2-U SN table 1310 to the lost X2-U SN table 1320. Here, XR in Equation 2 may be defined as the X2-U SN of the last PDU received by the second base station 120 from the first base station 110. In addition, RW denotes a PDCP reordering window value and may be defined as, for example, half of a PDCP SN size (PDCP SN space/2).

In Equation 2, when the difference between XR, which is the X2-U SN of the last received DL user data, and Xj is equal to or greater than the reordering window value RW, if receiving a PDCP SN value corresponding to Xj, a terminal increases an HFN by 1 according to an overflow counter mechanism, and thus HFN de-synchronization may occur. Therefore, the X2-UP protocol processing block 950 deletes Xj from a retransmission request list in order to prevent this de-synchronization. In Equation 2, when the difference between XR and Xj is less than 0 and the difference between XR and Xj plus 65536 is equal to or greater than the reordering window value, if receiving the PDCP SN value corresponding to Xj, the terminal also increases the HFN by 1 according to the overflow counter mechanism, and thus HFN de-synchronization may occur. In this case, the X2-UP protocol processing block 950 also deletes Xj from the retransmission request list. That is, the X2-UP protocol processing block 950 may determine not to request retransmission of a missed packet that may cause HFN de-synchronization, thereby preventing HFN de-synchronization in advance.

In other words, as described above in operations 1201 to 1207, the X2-UP protocol processing block 950 determines whether Xj satisfies Equation 2 by increasing j from 1 to n. The X2-UP protocol processing block 950 deletes Xj satisfying the condition of Equation 2 from the retransmission request list. As a result, the X2-UP protocol processing block 950 may finally obtain the lost X2-U SN table 1320.

Specifically, operation 1301 of FIG. 13 illustrates the case where XR is 37000, RW is 2048 and n is 4. In this case, the X2-UP protocol processing block 950 determines whether all values in the lost X2-U SN table 1310 satisfy Equation 2. The X2-UP protocol processing block 950 may perform operations 1201 to 1207 in order to determine an X2-U SN to exclude from a retransmission request.

In operation 1201, the X2-UP protocol processing block 950 starts the algorithm by inputting X1=34000 where j=1. In operation 1203, the X2-UP protocol processing block 950 determines whether X1=34000 satisfies the condition of Equation 2. The X2-UP protocol processing block 950 determines that the condition is satisfied because XR-X1 is equal to 3000 and is greater than RW 2048. In operation 1205, the X2-UP protocol processing block 950 deletes X1=34000 from the lost X2-U SN table 1310. In operation 1207, the X2-UP protocol processing block 950 increases j by 1, and returns to operation 1203 upon determining that j=2 is smaller than n=4.

In operation 1203, the X2-UP protocol processing block 950 determines whether X2=34001 satisfies the condition of Equation 2. The X2-UP protocol processing block 950 determines that the condition is satisfied because XR-X2 is equal to 2999 and is greater than RW 2048. In operation 1205, the X2-UP protocol processing block 950 deletes X2=34001 from the lost X2-U SN table 1310. In operation 1207, the X2-UP protocol processing block 950 increases j by 1, and returns to operation 1203 upon determining that j=3 is smaller than n=4.

In operation 1203, the X2-UP protocol processing block 950 determines whether X3=35000 satisfies the condition of Equation 2. The X2-UP protocol processing block 950 determines that the condition is not satisfied because XR-X3 is equal to 2000 and is smaller than RW 2048. The X2-UP protocol processing block 950 immediately proceeds to operation 1207. In operation 1207, the X2-UP protocol processing block 950 increases j by 1, and returns to operation 1203 upon determining that j=4 is equal to n=4.

In operation 1203, the X2-UP protocol processing block 950 determines whether X4=36000 satisfies the condition of Equation 2. The X2-UP protocol processing block 950 determines that the condition is not satisfied because XR-X4 is equal to 1000 and is smaller than RW 2048. The X2-UP protocol processing block 950 immediately proceeds to operation 1207. In operation 1207, the X2-UP protocol processing block 950 increases j by 1, and terminates the algorithm upon determining that j=5 is greater than n=4.

Accordingly, after terminating the algorithm for determining a retransmission request according to operations 1201 to 1207, the X2-UP protocol processing block 950 deletes 34000 and 34001, which are Xj satisfying the condition of Equation 2, thereby obtaining the updated table 1320.

According to one embodiment, the second base station 120 transmits feedback about a missed packet to the first base station 110 according to a preset condition and period. For example, the X2-UP protocol processing block 950 may transmit a DL data delivery status message including X2-U SN information included in the updated table 1320 to the first base station 110. That is, the X2-UP protocol processing block 950 may feed corresponding information back to the first base station 110 whenever the lost X2-U SN table is updated.

In operation 1303, the X2-UP protocol processing block 950 receives a different DL user data message from the first base station 110. According to one embodiment, upon receiving DL user data, the X2-UP protocol processing block 950 may update the lost X2-U SN table. When receiving the DL user data, the last received X2-U SN is changed, and thus the X2-UP protocol processing block 950 may update the lost X2-U SN table 1320 to the lost X2-U SN table 1330. Although the X2-UP protocol processing block 950 may receive DL user data between operations 1301 and 1303, the value of XR-Xj is smaller than RW, and thus the lost X2-U SN table 1320 may not be changed.

Specifically, operation 1303 of FIG. 13 illustrates the case where XR is 37048, RW is 2048 and n is 2. In this case, the X2-UP protocol processing block 950 determines whether all values in the lost X2-U SN table 1320 satisfy Equation 2. The X2-UP protocol processing block 950 may perform operations 1201 to 1207 in order to determine an X2-U SN to exclude from a retransmission request.

In operation 1201, the X2-UP protocol processing block 950 starts the algorithm by inputting X1=35000 where j=1. In operation 1203, the X2-UP protocol processing block 950 determines whether X1=35000 satisfies the condition of Equation 2. The X2-UP protocol processing block 950 determines that the condition is satisfied because XR-X1 is equal to 2048 and is equal to RW 2048. In operation 1205, the X2-UP protocol processing block 950 deletes X1=35000 from the lost X2-U SN table 1320. In operation 1207, the X2-UP protocol processing block 950 increases j by 1, and returns to operation 1203 upon determining that j=2 is equal to n=2.

In operation 1203, the X2-UP protocol processing block 950 determines whether X2=36000 satisfies the condition of Equation 2. The X2-UP protocol processing block 950 determines that the condition is not satisfied because XR-X2 is equal to 1048 and is smaller than RW 2048. The X2-UP protocol processing block 950 immediately proceeds to operation 1207. In operation 1207, the X2-UP protocol processing block 950 increases j by 1, and terminates the algorithm upon determining that j=3 is greater than n=2.

Accordingly, after terminating the algorithm for determining a retransmission request according to operations 1201 to 1207, the X2-UP protocol processing block 950 deletes 35000, which is Xj satisfying the condition of Equation 2, thereby obtaining the updated table 1330.

According to one embodiment, the second base station 120 transmits feedback about a missed packet to the first base station 110 according to a preset condition and period. For example, the X2-UP protocol processing block 950 may transmit a DL data delivery status message including X2-U SN information included in the updated table 1330 to the first base station 110. That is, the X2-UP protocol processing block 950 may feed corresponding information back to the first base station 110 whenever the lost X2-U SN table is updated.

For example, the DL data delivery status message transmitted via a DL from the second base station 120 to the first base station 110 may include 'Number of Lost X2-U Sequence Number Ranges Reported', 'Start of Lost X2-U Sequence Number Range', and 'End of X2-U Sequence Number Range' fields as illustrated in Table 1.

According to another embodiment, the X2-UP protocol processing block 950 may update the lost X2-U SN table according to Equation 2 whenever DL user data is received during a period in which a next DL data delivery status is fed back after feeding back a DL data delivery status. That is, the X2-UP protocol processing block 950 may feed back the updated table 1330 according to the feedback period without feeding back the table 1320 updated in operation 1301 to the first base station 110.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a base station in a wireless communication system, the method comprising:
   transmitting, by the base station, one or more packets to another base station;
   receiving, by the base station, information regarding one or more missed packets among the one or more packets from the another base station, the one or more missed packets including one or more first missed packets and one or more second missed packets;
   in response to receiving the information regarding the one or more missed packets from the another base station, generating, by the base station, a list of the one or more missed packets based on the received information;
   identifying, by the base station, the one or more first missed packets among the one or more missed packets based on an identification number of each of the one or more first missed packets;
   updating, by the base station, the list by excluding the one or more first missed packets other than the one or more second missed packets among the one or more missed packets from the list; and
   retransmitting, by the base station, the one or more second missed packets to the another base station, without retransmitting the one or more first missed packets based on the updated list,
   wherein the identification number satisfies that an identification number of a last packet transmitted to the another base station minus the identification number of each of the one or more first missed packets is equal to reordering window value or greater than the reordering window value, and
   wherein the identification number of each of the one or more missed packets is a X2-U SN.

2. The method of claim 1, wherein the reordering window value is half of a packet data convergence protocol (PDCP) sequence number (SN) size.

3. A base station in a wireless communication system, the base station comprising:
   a transceiver; and
   at least one processor coupled to the transceiver and configured to:
   transmit one or more packets to another base station,
   receive information regarding one or more missed packets among the one or more packets from the another base station, the one or more missed packets including one or more first missed packets and one or more second missed packets, in response to receiving the information regarding the one or more missed packets from the another base station, generate a list of the one or more missed packets based on the received information, identify the one or more first missed packets among the one or more missed packets based on an identification number of each of the one or more first missed packets, update the list by excluding the one or more first missed packets other than the one or more second missed packets among the one or more missed packets from the list, and retransmit the one or more second missed packets to the another base station, without retransmitting the one or more first missed packets based on the updated list, wherein the identification number satisfies that an identification number of a last packet transmitted to the another base station minus the identification number of each of the one or more first missed packets is equal to reordering window value or greater than the reordering window value, and wherein the identification number of each of the one or more missed packets is a X2-U SN.

4. The base station of claim 3, wherein the reordering window value is half of a packet data convergence protocol (PDCP) sequence number (SN) size.

\* \* \* \* \*